United States Patent
Prokhorov

(10) Patent No.: US 9,994,235 B2
(45) Date of Patent: Jun. 12, 2018

(54) HUMAN-MACHINE INTERFACE DEVICE AND METHOD FOR SENSORY AUGMENTATION IN A VEHICLE ENVIRONMENT

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days. days.

(21) Appl. No.: 15/267,548

(22) Filed: Sep. 16, 2016

(65) Prior Publication Data

US 2018/0079429 A1   Mar. 22, 2018

(51) Int. Cl.
| | |
|---|---|
| *B60Q 1/00* | (2006.01) |
| *B60W 50/16* | (2012.01) |
| *H04B 1/3822* | (2015.01) |
| *H04B 1/3827* | (2015.01) |
| *H04W 4/04* | (2009.01) |
| *G08B 6/00* | (2006.01) |

(52) U.S. Cl.
CPC .............. *B60W 50/16* (2013.01); *G08B 6/00* (2013.01); *H04B 1/385* (2013.01); *H04B 1/3822* (2013.01); *H04W 4/046* (2013.01)

(58) Field of Classification Search
CPC ........ B60Q 9/008; B60Q 1/525; G08G 1/166; G08G 1/167; G08G 1/165
USPC .......................... 340/435–436, 903, 925, 944
See application file for complete search history.

(56) References Cited

U.S. PATENT DOCUMENTS

| | | | |
|---|---|---|---|
| 2008/0120029 A1* | 5/2008 | Zelek | G01C 21/20 701/469 |
| 2011/0090093 A1* | 4/2011 | Grimm | G01S 5/0072 340/901 |

(Continued)

OTHER PUBLICATIONS

Archer, "2013 Cadillac XTS to Offer Safety Alert Seat That Vibrates," Retrieved from the Internet: <http://www.autotrader.com/car-news/2013-cadillac-xts-to-offer-safety-alert-seat-that-vibrates-170011>, Retrieved Jul. 11, 2016, published Jun. 2012, 1 page.

(Continued)

*Primary Examiner* — Joseph Feild
*Assistant Examiner* — Sharmin Akhter
(74) *Attorney, Agent, or Firm* — Christopher G. Darrow; Darrow Mustafa PC

(57) ABSTRACT

A device and method for a human machine interface (HMI) device to provide sensory augmentation in a vehicle environment are disclosed. The device and method include receiving, via a vehicle network, location data relating to a vehicle obstacle identified by a vehicle sensor. With the location data, the device and method include identifying a haptic device of a plurality of haptic devices correlating to the location data and to a directional reference, wherein the plurality of haptic devices distributed in a defined-relation along a wearable band device and operable to convey directional information. With the haptic device being identified, the device and method include generating a haptic signal, by the haptic device, to define a vector relating to the vehicle obstacle with respect to the directional reference.

17 Claims, 7 Drawing Sheets

(56) References Cited

U.S. PATENT DOCUMENTS

| | | | |
|---|---|---|---|
| 2011/0316686 A1* | 12/2011 | Matsuno | B60Q 9/004 340/435 |
| 2015/0077324 A1* | 3/2015 | Birnbaum | G06F 3/016 345/156 |
| 2016/0207454 A1 | 7/2016 | Cuddihy et al. | |

OTHER PUBLICATIONS

Dent, "Headband Detects Obstacles and Guides the Blind Haptically," Retrieved from the Internet: <https://www.engadget.com/2015/11/20/headband-detects-obstacles-and-guides-the-blind-haptically/>, Retrieved Jul. 11, 2016, published Nov. 20, 2015, 3 pages.

"Less-distracting Haptic Feedback Could Make Car Navigation Safer Than GPS Audio and Displays," Retrieved from the Internet: <KurzweilAI, http://www.kurzweilai.net/less-distracting-haptic-feedback-could-make-car-navigation-safer-than-gps-audio-and-displays>, Retrieved Jul. 11, 2016, published Feb. 15, 2016, 4 pages.

* cited by examiner side view
human-machine
interface (HMI) device 300 top view
HMI device 300 haptic signal translocation haptic signal generation vehicle network environment 701

HMI device
control unit 420
(slave)

HUMAN-MACHINE INTERFACE DEVICE AND METHOD FOR SENSORY AUGMENTATION IN A VEHICLE ENVIRONMENT

BACKGROUND

Human-machine interfaces (HMI) have been provided to improve operation and control of vehicles by a user, while the vehicle provides feedback information that aids the user's decision-making process. Examples may include blind-spot indicators, fuel efficiency feedback indicators, operator fatigue indicators, etc. It is desirable to improve vehicle sensor human-machine communications relating to vehicle obstacles.

SUMMARY

A device and methods for a human-machine interface device for sensory augmentation in a vehicle environment are disclosed.

In one implementation, a human machine interface (HMI) device for sensory augmentation in a vehicle environment is disclosed. The HMI device includes a wireless communication interface to service communication with a vehicle network, a wearable band device, a processor, and a memory. The wearable band device includes a plurality of haptic devices distributed in a defined-relation along the wearable band device and operable to convey directional information. The processor is coupled to the wireless communication interface and to the wearable band device, the processor for controlling operations of the wearable band device. The memory is coupled to the processor, and is for storing data and program instructions used by the processor. The processor is configured to execute instructions stored in the memory to receive, via the wireless communication interface, location data relating to a vehicle obstacle identified by a vehicle sensor and identify a haptic device of the plurality of haptic devices correlating to the location data and to a directional reference. The HMI device is operable to generate a haptic signal, by the haptic device, to define a vector relating to the vehicle obstacle with respect to the directional reference.

In another implementation, a method in a human machine interface (HMI) device for sensory augmentation in a vehicle environment is disclosed. The method includes receiving, via a vehicle network, location data relating to a vehicle obstacle identified by a vehicle sensor. With the location data, the method includes identifying a haptic device of a plurality of haptic devices correlating to the location data and to a directional reference, wherein the plurality of haptic devices distributed in a defined-relation along a wearable band device and operable to convey directional information. With the haptic device being identified, the method includes generating a haptic signal, by the haptic device, to define a vector relating to the vehicle obstacle with respect to the directional reference.

BRIEF DESCRIPTION OF THE DRAWINGS

The description makes reference to the accompanying drawings wherein like reference numerals refer to like parts throughout the several views, and wherein.

DETAILED DESCRIPTION

A human-machine interface (HMI) device for sensory augmentation, via haptic feedback, to a vehicle user and/or passenger is disclosed.

Human-machine interface (HMI) devices are intended to provide a user interface that is easy and/or self-explanatory to use, efficient, and user-friendly to operate a vehicle to produce a desired operational result. Allowing a user to provide minimal input to achieve the desired result, while minimizing undesired vehicle feedback information, drives HMI device efficiency. Also, it is desirable to improve vehicle sensor human-machine interfaces as relating to vehicle obstacles, particularly for highly automated and intelligent vehicles taking on ever increasing complex tasks from the human operator.

The term "obstacle" or "vehicle obstacle" as may be used herein refers to objects external to the present vehicle that may increase a hazard and/or danger to the present vehicle, or may increase a likelihood of a hazard and/or danger to the present vehicle to the extent that an evasive action may be needed to around and/or otherwise avoid such hazard and/or danger. Examples of an obstacle or vehicle obstacle may include a pedestrian, cyclist, object, another vehicle (car, SUV, truck, commercial vehicles, road debris, etc.).

Promising HMI device technology has been based on haptic feedback. For example, a haptic feedback may be provided upon an event occurrence, such as a phone message/call, a watch alarm, etc. On the other hand, haptic feedback may be provided when a vehicle user requires such feedback during relatively short and intended moments of interaction with the vehicle, such as instances when user intervention is called for to avert damage to the vehicle or to others, such as with driver-assist and/or manual vehicle operation.

Also, haptic feedback may provide sensory augmentation in an autonomous vehicle environment. Current HMI devices, such as audio/visual HMI devices, require the attention of an autonomous vehicle operator and/or passenger to be effective. Also, with rapid events, such as swerving to avoid a vehicle obstacle, by the time the audio and/or visual feedback is provided, the event has passed, leaving the operator and/or passenger without timely feedback.

The HMI device disclosed is wearable, and through vehicle sensor devices, may provide haptic feedback indicating a direction of a vehicle obstacle. Moreover, vehicle sensor device data may be filtered to categorize identified various vehicle obstacles and haptic feedback provided via the wearable HMI device disclosed.

Figure 1:
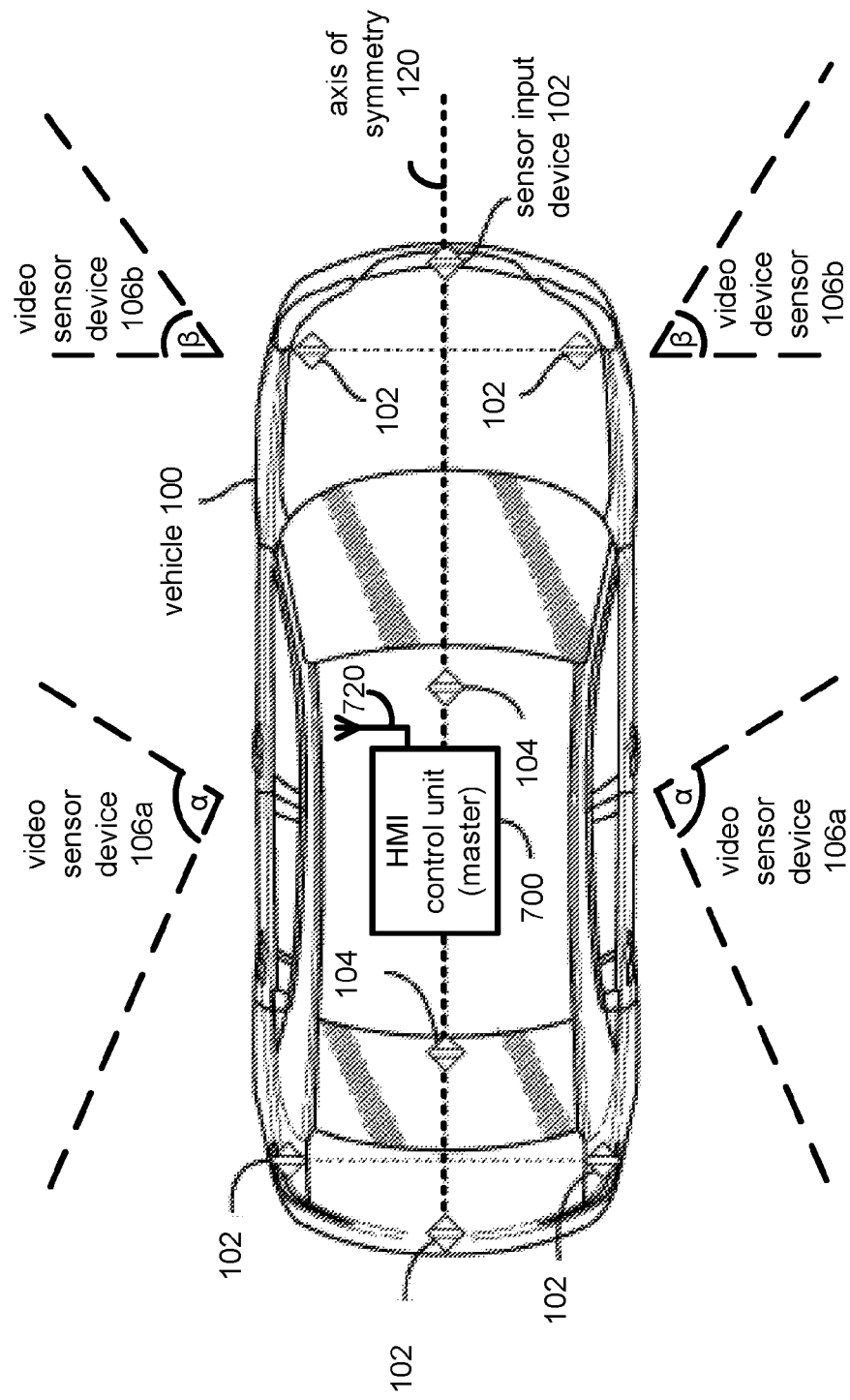
FIG. 1 is a schematic illustration of a vehicle including a human-machine interface (HMI) control unit.

FIG. 1 is a schematic illustration of a vehicle 100 including a human-machine interface (HMI) control unit 700. A plurality of sensor devices 102 are in communication with the control unit 200.

The master designation of the HMI control unit 700 indicates master/slave communication model with a HMI device 300, which is discussed in detail with reference to FIGS. 2-9. Under a master/slave communication model, the HMI control unit 700 controls the HMI device 300. In this manner, to provide sensor data on a timely basis, the HMI control unit 700 may operate to override and/or take precedence of other operations of the HMI device 300. In this manner, the HMI control unit 700 may operate to provide location data of a vehicle obstacle to the HMI device 300. In turn, the HMI device 300 is operable to generate and deliver haptic feedback based on the sensor data. The HMI control unit 700 may include an antenna 720 coupled to a wireless communications interface to provide wireless communication with the HMI device 300, which is discussed in detail with reference to FIGS. 2-9.

A plurality of sensor devices 102, 104 and/or 106 are in communication with the HMI control unit 700. The plurality of sensor devices 102, 104 and 106 may be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device.

Communication between the sensors and vehicle control units, including HMI control unit 700, may be on a bus basis, and may also be used or operated by other systems of the vehicle 100. For example, the sensor devices 102, 104 and 106 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor input devices 102 may be further coupled to the HMI vehicle control unit 700 via such communication-system architectures.

The sensor devices include sensory input devices 102, audible sensor devices 104, and video sensor devices 106a and 106b.

The sensory input devices 102 provide tactile or relational changes in the ambient conditions of the vehicle, such as an approaching pedestrian, cyclist, object, vehicle, road debris, and other such vehicle obstacles (or potential vehicle obstacles). One or more of the sensory input devices 102 may be configured to capture changes in velocity, acceleration, and/or distance to these objects in the ambient conditions of the vehicle 100, as well as the angle of approach. The sensory input devices 102 may be provided by a Light Detection and Ranging (LIDAR) system, in which the sensory input devices 102 may capture data related to laser light returns from physical objects in the environment of the vehicle 100. The sensory input devices 102 may also include a combination of lasers (LIDAR) and milliwave radar devices.

The audible sensor devices 104 may provide audible sensing of the ambient conditions of the vehicle 100. With speech recognition capability, the audible sensor devices 104 may receive instructions to move, or to receive other such directions. The audible sensor devices 104 may be provided, for example, by a nano-electromechanical system (NEMS) or micro-electromechanical system (MEMS) audio sensor omnidirectional digital microphone, a sound-triggered digital microphone, etc.

As may be appreciated, a vehicle interior space may be highly noise-insulated to improve a passenger and/or operator's travel experience. On the other hand, utility vehicles (such as trucks, construction vehicles, etc.) have little noise insulation. Accordingly, the interior may be filled with noise pollution from friction from moving air, the roadway, or a construction site. The audible sensor devices 104 may be filtered to remove the noise pollution, and provide sensor data that may relate to an approaching person, cyclist, object, vehicle, and other such vehicle obstacles (or potential vehicle obstacles), and such data be conveyed via the HMI control unit 700 to a HMI device 300.

The video sensor devices 106a and 106b include associated fields of view. For the example of FIG. 1, the video sensor device 106a has a three-dimensional field-of-view of angle-$\alpha$, and the video sensor device 106b has a three-dimensional field-of-view of angle-$\beta$, with each video sensor having a sensor range for video detection.

In the various driving modes, the examples of the placement of the video sensor devices 106a for blind-spot visual sensing (such as for another vehicle adjacent the vehicle 100) relative to the vehicle user, and the video sensor devices 106b are positioned for forward periphery visual sensing (such as for objects outside the forward view of a vehicle user, such as a pedestrian, cyclist, vehicle, road debris, etc.).

For controlling data input from the sensors 102, 104 and 106, the respective sensitivity and focus of each of the sensor devices may be adjusted to limit data acquisition based upon speed, terrain, activity density around the vehicle, etc.

For example, though the field-of-view angles of the video sensor devices 106a and 106b may be in a defined relation to the vehicle 100, the field-of-view angles may be adaptively increased and/or decreased based upon the vehicle's driving mode, such as a highway driving mode to take in less of the ambient conditions in view of the more rapidly changing conditions relative to the vehicle 100, a residential driving mode to take in more of the ambient conditions that may change rapidly (such as a child's ball crossing in front of the vehicle, etc.), a parking mode in which a full field-of-view may be used to increase a sensitivity towards changes in ambient conditions relative to the vehicle 100, with the sensitivity extended further to realize changes in at least one ambient condition relative to the vehicle.

Also, some of the sensors may effectively be blocked depending upon the driving mode of the vehicle 100. For example, when the vehicle 100 is traveling at highway, or even residential, speeds, the audible sensor devices 104 simply detect white noise from the air moving across the microphone pick-up and may not be sufficiently filtered to remove the extraneous data input. In such instances, the input from the audible sensor devices 104 may be switched to an off or placed in a sleep mode until the vehicle 100 returns to a lower velocity.

The vehicle 100 may also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In autonomous mode, a computing device, which may be provided by the HMI control unit 700, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device. For example, the vehicle user can control certain aspects of the vehicle operation, such as steering, while the computing device can control other aspects of the vehicle operation, such as braking and acceleration. When the vehicle 100 is operating in autonomous (or driver-assist) mode, the computing device 100 issues commands to the various vehicle systems to direct their operation, rather than such vehicle systems being controlled by the vehicle user.

As shown in FIG. 1, the HMI control unit 700 is configured to provide wireless communication with a user device through the antenna 720, other vehicles (vehicle-to-vehicle), and/or infrastructure (vehicle-to-infrastructure), or with devices through a network cloud. The antenna 720 may also provide wireless communication with an HMI device 300, which is discussed in detail with respect to FIGS. 2-9.

Figure 2:
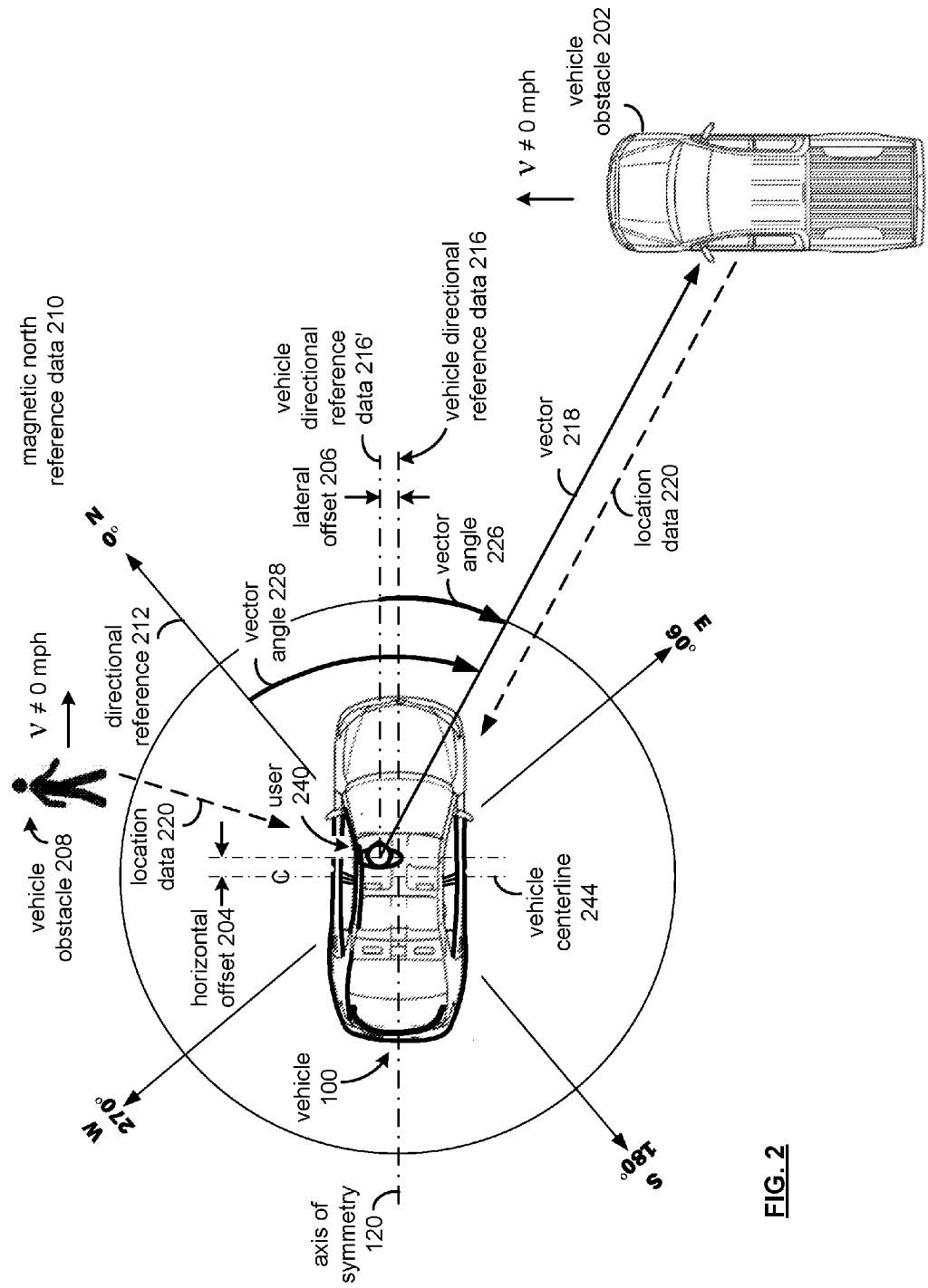
FIG. 2 is a schematic illustration of the vehicle providing a directional reference for a human machine interface (HMI) device.

FIG. 2 is a schematic illustration of a vehicle 100 providing a directional reference 212 and/or a vehicle directional reference data 216 for a human machine interface (HMI) device 300. A plurality of sensor devices 102, 104 and/or 106 operate to provide a sensing of a vehicle obstacle 202.

The vehicle 100 has an axis of symmetry 120 and a vehicle centerline 244. The vehicle 100 includes a digital compass, operable to sense magnetic north reference data 210. As may be appreciated, a digital compass may include magneto-inductive technology to sense the difference in the earth's magnetic field from disturbances that may be caused by external vehicle elements, such as ferro-magnetic materials and magnetic fields generated by a vehicle's electrical systems. Processors of the digital compass may operate to subtract the distortion caused by the vehicle 100 magnetic field form the relatively stronger earth-based magnetic fields to produce compass readings.

In FIG. 2, the compass bearings for North (0 degrees and/or 360-degrees), East (90 degrees), South (180 degrees), and West (270 degrees), are illustrated. Generally, the orientation of the vehicle 100 may not align with the compass bearings based upon the direction of travel. However, the directional reference 212 is available as a constant to the vehicle 100 due to the reliance upon magnetic north, via reference data 210. The vehicle directional reference data 212 provides another reference point, as it may pertain to the travel direction of the vehicle 100. Such a reference point may be relied upon when readings to magnetic North may be unavailable to digital compass technology of the vehicle 100.

A horizontal offset 204 and a lateral offset 206 relate to the user 240 with respect to a difference in position with respect to the vehicle directional reference data 216 (which may also be referred to an axis of symmetry 120) and centerline 244. The horizontal and lateral offsets may be applicable to any of the passenger positions of the vehicle. For clarity, the example of the offset relates to that of the vehicle operator position, as indicated by the user 240.

The offsets 204 and 206 may relate to a granularity of the vector 218 generated by a HMI device 300. That is, the finer the distinction of a haptic feedback of the device 300, the greater need for the level of detail relating to orienting the haptic feedback to the user 240, and to provide sensory augmentation to the user 240 relating to a vehicle obstacle (such as, for example, vehicle obstacles 202 and/or 208), as is discussed in detail with respect to FIGS. 3-9.

With a coarser level of detail, the horizontal offset 204 and the lateral offset 206 may be within acceptable tolerances for the operation of the HMI device 300.

In operation, the vehicle sensors 102, 104 and/or 106 may operate to generate a vector angle 226 based on a vehicle directional reference data 216', or on a directional reference 212. A vector, generally, may be understood to include direction 212 and/or 216', as well as a magnitude, in terms of distance, to determine a position of a vehicle obstruction to the vehicle 100.

With the example of FIG. 2, vehicle obstacles 202 and 208 are presented. The vehicle obstacle 202 may be represented as a vehicle traveling in an orthogonal direction to that of the vehicle 100 to potentially raising a collision scenario. The vehicle obstacle 208 may be represented as a pedestrian traveling in a direction generally parallel to the vehicle 100. The vehicle 100, via the sensor devices 102, 104 and/or 106 operates to determine location 220 to each of the vehicle obstacles 202 and 208.

The vehicle 100 may note each of the vehicle obstacles 202 and 208, but may filter the likelihood of a viable vehicle obstruction. Generally, as an example, rules may apply that sensed vehicle obstructions moving orthogonal to the travel of the vehicle 100, such as vehicle obstacle 202, provide a greater probability of damage to the vehicle 100, than those moving parallel and at a slower velocity, to the vehicle 100, such as vehicle obstacle 208. Accordingly, the HMI control unit 700 may weigh multiple possible vehicle obstacles on a rule and/or probability determination, and upon such determination, provide and alert to a user 240 via a HMI device 300.

Figure 3:
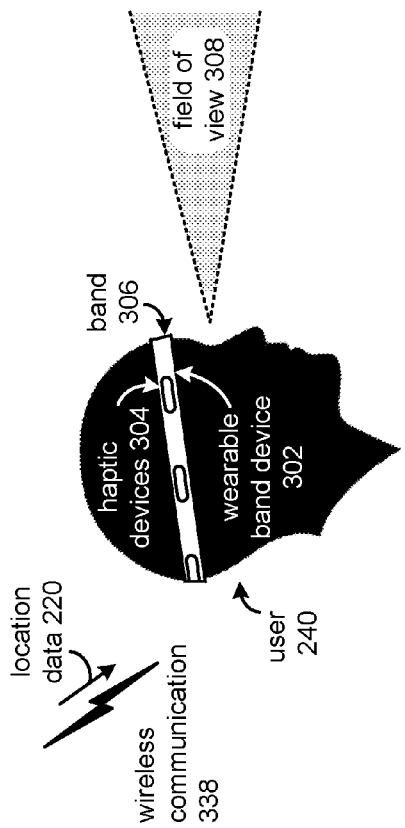
FIG. 3 illustrates a side view of a human-machine interface (HMI) device.

FIG. 3 illustrates a side view of a human-machine interface (HMI) device 300 worn by a user 240. The HMI device 300 may include a wearable band device 302. The wearable band device 302 includes a plurality of haptic devices 304 in a defined relation to a band 306. The band 306 and haptic devices 304 may be flexible and/or malleable to provide form fitting capability for different head shapes and hair styles that in turn provides improved wearing comfort to the user.

The band 306 may be provided as a length of fabric of a width to accept the haptic devices 304. The fabric may be natural, manufactured, composite, elastic, continuous loop, a strip that may be latched or coupled to form the band 306, etc. An inner diameter of the band 306 is of a size to provide tactile engagement with the skin of the user 240 to convey haptic signals produced by the haptic devices 304. As may be appreciated by one of skill in the art, the band 306 may also be provided as other articles of clothing, such as a belt, a sash, a girdle, a choker, a cummerbund, a headband, etc. Also, the HMI device 300 may be incorporated in articles of clothing, such as headwear (that is, a hat, visor, etc), an inner waist lining of a skirt, slacks, etc.

As may also be appreciated, the band 306 may be provided by a rigid material, such as an acrylic and/or resin material. Also, when the material has sufficient shape memory, it may not provide a complete ring about the user 240 because the material memory provides sufficient compression to convey haptic signals by the haptic devices 304.

The haptic devices 304 may be incorporated with the band 306 in various manners, such as surface mounted, concealed within material layers, partially-exposed near the skin of the user 240 to improve reception of a haptic signal and/or reaction force by the plurality of haptic devices, etc.

Haptic devices 304 may operate to provide sensory augmentation by transcribing vehicle sensor data to the user 240.

For example, a sensor 102, 104 and/or 106 may identify a vehicle obstacle and generate a distance and direction to the vehicle obstacle. Conventionally, a vehicle obstacle may be visually and/or audibly presented to the user 240 as a graphic (such as displayed on a user interface map), an image (a streaming feed to a vehicle touch screen), a proximity alert via indicator lights/alarm (such as a blind-spot alert), etc.

The HMI device 300 includes a wireless communication interface to provide a wireless communication 338 with the HMI control unit 700 (see, e.g., FIG. 1). The wireless communication 338 allows the location data 220, based on data from the sensor devices 102, 104 and/or 106, to be received by the HMI device 300. The haptic devices 304 may operate to transcribe such visual information relating to distance and direction of the location data 220 as haptic signals through the HMI device 300. Haptic signals may operate to contribute micro details to visualization while the macro details may be contributed by a human-visual system.

The haptic signal may include tactile feedback. Tactile, also referred to as touch, feedback is refers to sensations felt by the skin. Tactile feedback may convey to users touch sensations such as surface texture, temperature, and vibration. As may be appreciated by one of skill in the art, human sensorial characteristics provide faster responses and/or reaction to haptic feedback as compared to visual feedback.

For example, graphic imaging has scene refresh rates of about twenty to thirty frames/sec. In contrast, tactile sensors in the skin respond well to vibrations higher than three-hundred hertz.

The haptic devices 304 may transcribe vehicle sensor data through encoding information presented as haptic signals by haptic devices 304. The haptic signals may be provided as reaction forces that may form haptic icons, symbols and/or glyphs. Such reaction forces may be provided as a distinct haptic effect to represent vehicle obstacle information to the user 240.

The vehicle obstacle information may convey the possibility or likelihood that a vehicle obstacle, through location data 220, may cause damage or present a danger to the vehicle 100 and the occupants based on the sensor data. Moreover, as the conditions change (that is, a vehicle obstacle increases speed, decreases speed, changes direction, the distance to the obstacle closes relative to the vehicle 100, etc.), the haptic signals may vary in magnitude and/or frequency to represent changing conditions of the vehicle obstacle. For example, on a fuzzy logic basis, the magnitude and/or frequency may increase as the vehicle obstacle is closing on a "fast", "too fast", or "way too fast" rate, respectively.

The haptic signals may be intuitive in nature. That is, the haptic signals may be interpreted by the user 240 without specific training. For example, the haptic signals may mimic or be based on human behavior. When faced with a threat or danger, the haptic signals may be at a frequency and/or magnitude to resemble increased pulse rate (having a similar frequency and/or magnitude). As a threat or danger increases, a pulse rate may tend to increase. Accordingly, a user 240 may readily learn and remember such intuitive haptic signals and the conveyed meaning, which may be adapted to his or her preferences. Such preferences may be based on a user-preference profile entered through a graphic user interface (such as via a vehicle touch screen of a head unit device, a smart phone application of a handheld mobile unit, a web site for parameter entries, etc.), and applied to the HMI device 300.

On the other hand, the haptic signals may be based on abstract codes, such as Braille, Morse code, 5×5 Tap Code, etc. Abstract codes offer more extensive sets of available signals and content, but may require training and practice by a user 240. For example, vehicle state information may be conveyed through abstract codes, such as velocity, miles traveled, vehicle servicing needs, etc.

Also, haptic signals generated by the haptic devices may include surface haptics. Surface haptics refer to generating variable forces on the skin of a user 240 via a singular haptic device and/or a plurality of haptic devices. Such variable forces may be produced by an electrostatic technology for producing in-plane forces by a haptic device and/or devices 304. In contrast, ultrasonic technologies implemented by a haptic device 304 may operate to modulate a "slipperiness" or friction sensation of a haptic device surface, to produce a floating sensation to the skin. Examples of haptic devices 304 may include a tension-based haptic device, a vibrotactile device, a surface haptic device, a linkage-based haptic device, etc.

Also, the haptic devices may also generate haptic signals based on vibration patterns including a vibration magnitude and frequency. For example, haptic devices 304 may include controllable vibration motors, force feedback technology, tactile feedback technology, etc.

Figure 4:
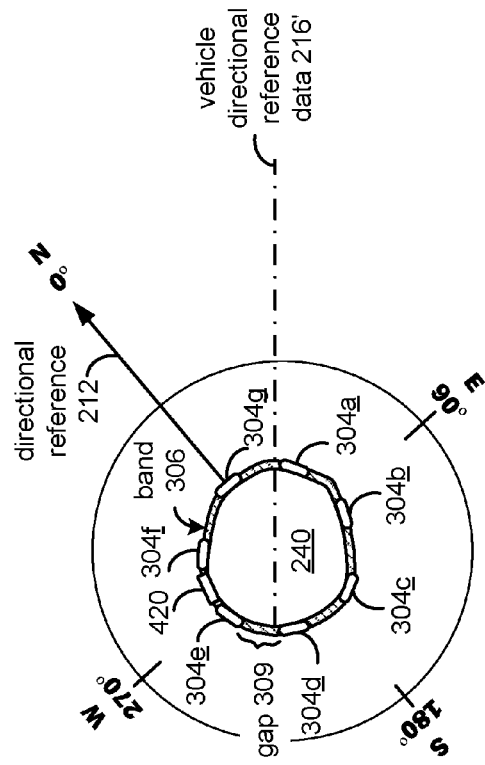
FIG. 4 illustrates a top view of the HMI device of FIG. 3 about the head of a user and in relation to a directional reference.

FIG. 4 illustrates a top view of the HMI device 300 about the head of a user 240 in relation to a directional reference 212. The HMI device 300 includes a plurality of haptic devices 304a to 304g, a band 306, and a HMI control unit 420.

The plurality of haptic devices 304 include haptic devices 304a to 304g, which may be each separated by a gap 308. The number of haptic devices 304 and the corresponding gap 309 may vary based on the inner diameter of the band 306. For example, the inner diameter to accommodate a child is small than that of an adult.

Also, the number of haptic devices 304 provide a level of tactile granularity between devices. That is, the granularity may be based on the capability of tactile receptors of the skin to discern a tactile signal of different tactile devices. Moreover, to the extent that the HMI device 300 operates to direct a user's 240 attention to a vehicle obstacle, a generally large tolerance is provided by a user's field of view 308 to visually identify a vehicle obstacle when given a direction via location data 220 via the tactile devices 304a to 304g.

The HMI device control unit 420 may be provided between haptic devices 304a to 304g. Also, the HMI device control unit 420 may be provided as a separate unit away from the band 306, and may removably coupled to allow separate device charging.

The HMI device 300 may be define a directional reference of the wearable band device 302 relative to the plurality of haptic devices 304. Also, as the user 240 moves their head, the directional reference may be sustained and/or updated to provide continued operation of the HMI device 300.

To define and sustain the directional reference 212, the HMI device control unit 420 may include a digital compass sensor device (not shown), which may include magneto-resistive sensors on an orthogonal orientation for sensing horizontal components of the earth's magnetic field. In this manner, the HMI device 300 may define a directional reference 212, based on magnetic north, relative to the plurality of haptic devices 304a to 304g. Accordingly, use of the HMI device 300 does not require specific alignment when worn by the user 240 to provide the haptic signals as discussed in detail with reference to FIGS. 5-9.

Also, the vehicle 100 may provide vehicle directional reference data 216' that the HMI device 300 may alternatively use to provide haptic feedback to a user 240. As indicated, the vehicle directional reference data 216' is based on a lateral offset 206 (see FIG. 2), and generally correlates to a vehicle heading.

As may be appreciated, the digital compass sensor device (not shown) of the HMI control unit 420 may be operable to provide a heading, and further incorporate a lateral offset 206 with respect to the axis of symmetry 106 for the vehicle 100 (see FIG. 1).

Figure 5:
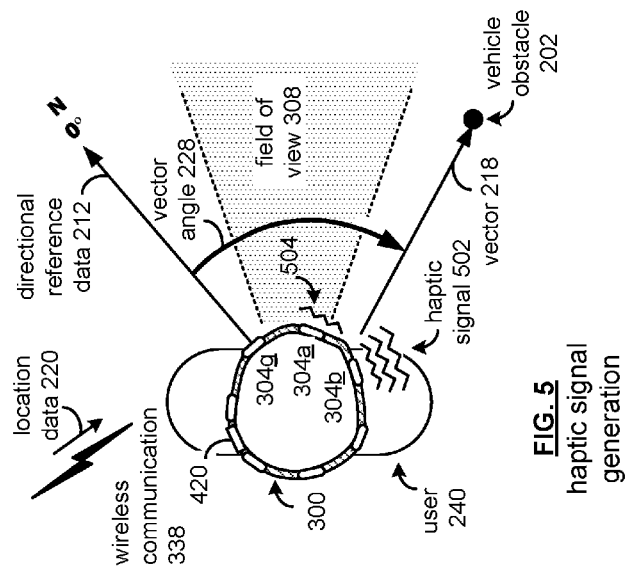
FIG. 5 illustrates directional haptic signal generation by the HMI device of FIG. 3.

FIG. 5 illustrates directional haptic signal generation by the HMI device 300. The HMI device 300 operates to receive, via a wireless communication interface of the HMI device control unit 420, location data 220 carried by the wireless communication 338. The location data 220 may be provided via an HMI control unit of the vehicle 100, and is based on sensor data provided by sensor devices 102, 104 and/or 106. As may be appreciated, the location data 220 may be in a polar coordinate format and/or in a Cartesian coordinate format. The location data 220 relates to a vehicle obstacle 202, which may be an approaching pedestrian, cyclist, object, vehicle, road debris, and other such vehicle obstacles (or potential vehicle obstacles).

The HMI device 300 operates, via the HMI device control unit 420, to identify a haptic device from the haptic devices 304a to 304g correlating to the location data 220 and to the directional reference 212. In the example provided, the haptic device identified as correlating to the location data 220 and the directional reference 212 is haptic device 304b.

The HMI device control unit 420 generates a haptic signal 502 via the haptic device 304b to define the vector 218. In this manner, the user 240 may direct the user's field of view 308 towards the haptic signal 502. The haptic signal 502 may operate to contribute micro details to visualization by the user 240, while the macro details may be contributed by a human-visual system via the field of view 308.

The haptic signal 502 may include tactile feedback. Tactile, also referred to as touch, feedback refers to sensations felt by the skin. Tactile feedback may convey to users touch sensations such as surface texture, temperature (cooling and/or warming), and vibration. As may be appreciated by one of skill in the art, human sensorial characteristics provide faster refresh rates for haptic feedback as compared to visual feedback.

For example, graphic imaging may have scene refresh rates of about twenty to thirty frames/sec. In contrast, tactile sensors/receptors of the skin may respond well to vibrations higher than three-hundred hertz.

The haptic device 304b may transcribe the vehicle sensor data by encoding information presented as haptic signal 502 by haptic device 304b. The haptic signal 502 may be a reaction force, which in turn may be in the form of haptic icons, symbols and/or glyphs. Such reaction forces may be provided as a distinct haptic effect to represent vehicle obstacle information to the user 240.

The vehicle obstacle information may convey the possibility or likelihood that a vehicle obstacle 202, through location data 220, may cause damage or present a danger to the vehicle 100 and the occupants based on sensor data via sensor devices 102, 104 and/or 106.

Moreover, as the conditions change (that is, a vehicle obstacle increases speed, decreases speed, changes direction, the distance to the obstacle closes relative to the vehicle 100, etc.), the haptic signal 502 may vary in magnitude and/or frequency to represent changing conditions of the vehicle obstacle. For example, on a fuzzy logic basis, the magnitude and/or frequency may increase as the vehicle obstacle is closing on a "fast", "too fast", or "way too fast" rate, respectively.

Also, the haptic signal 502 generated by the haptic device 304b may include surface haptics. Surface haptics refer to generating variable forces on the skin of a user 240 via a singular haptic device 304b and/or a plurality of haptic devices, such as haptic device 304a.

The HMI device control unit 420 may operate to identify another haptic device, such as haptic device 304a, that may further correlate to the location data 220 and to the directional reference 212. The HMI device control unit 420 may generate another haptic signal 504, by another haptic device 304a, to further define the vector 218 relating to the vehicle obstacle 202.

As presented by the example of FIG. 5, the haptic signal 502 is indicated as having a magnitude greater than that of the haptic signal 504 of the haptic device 304a. Also, the haptic signal 502 and 504 may be provided in series and/or sequentially, to provide a subtle alert that increases towards the vector 218. In this manner, a user 240 may not be startled by a sudden large magnitude haptic feedback, such as vibration of the haptic signal 502, while a larger magnitude of haptic feedback, such as a vibration or even a different type of haptic feedback (such as temperature) of the haptic signal 504, comparatively. The differences in magnitude are sufficient to direct the user's field of view 308 toward a vehicle obstacle 202. Also, the haptic signal 502 may be initiated by the haptic device 304b at a lower magnitude feedback (such as vibration), and increase in magnitude to provide an alert to the user 240.

In an autonomous vehicle setting, the haptic signal 502 may operate to provide information to the user 240 relating to sudden, unexpected maneuvers that the vehicle 100 may conduct to avoid the vehicle obstacle 202. In a driver-assist vehicle setting, the haptic signal 502 may operate to provide information to the user 240 to be aware of the vehicle obstacle 202, and for the user 240 to engage in evasive maneuvers to avoid the vehicle obstacle 202.

As may be appreciated, the location data 220 relating to a vehicle obstacle 202 may also be displayed to a touch screen of the vehicle, as well as also indicated by alert indicators. Such information, however, does not direct the attention of the user 240 to the actual vehicle obstacle 202, which may prompt a reaction delay by the user 240. Instead, the HMI device 300 operates to direct the attention of the user 240 to the matter at hand, which is the vehicle obstacle 202, and the resulting maneuver in an autonomous environment, or the need to engage in evasive maneuvers in a driver-assist environment.

Also, when multiple vehicle obstacles 202 may occur, and in turn prompting multiple possible location data 220 (see, e.g., FIG. 2), the HMI device 300 may discern a priority to the multiple vehicle obstacles 202, and in some instances disregard as non-threatening to the vehicle 100 (for example, the vehicle obstacle 208 of FIG. 2). In general, various artificial and/or computational intelligence may be employed to facilitate machine understanding of a driving scenario, that can also incorporate behavior analysis and prediction of various vehicle obstacles, such as vehicle obstacle 202 and/or 208, for example.

Also, the HMI device 300 may also determine with the location data 220 calls for a haptic signal 502 to be generated, based on a threat criteria. For example, a pedestrian 208, such as that in the example of FIG. 2, that may be considered and/or identified as a vulnerable or a non-threatening vehicle obstacle, moving parallel to the vehicle 100 may be considered a vehicle obstacle 202; however, because the vehicle may have passed the pedestrian, the HMI device 300 may determine the information as not on a need-to-know basis by the user 240.

Figure 6:
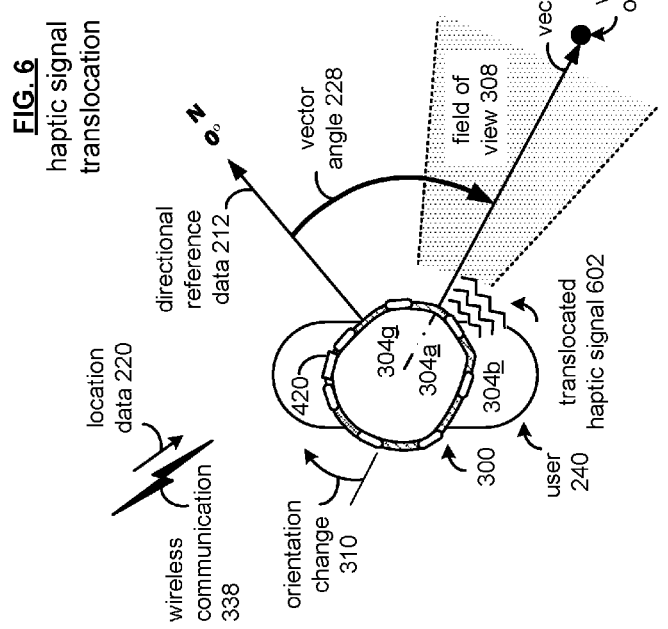
FIG. 6 illustrates a haptic signal translocation based on a change in orientation by the HMI device of FIG. 3.

FIG. 6 illustrates a haptic signal location by the HMI device 300. As the haptic signal 502 operates to draw the field of view 308 towards a vehicle obstacle 202, an orientation change 310 occurs via the wearable band device 302. When a threshold is surpassed, such as exceeding margins defining an at-rest field of view 308, such as the example of FIG. 5, a translocation of the haptic signal 502 occurs to continue the significance of the haptic signal 502 in alerting the user 240 to a vehicle object 202. The threshold 602 may generally correspond to a gap 309 (see FIG. 3) between the haptic devices 304, are may be adjusted to provide a larger tolerance threshold before translocation, or a smaller tolerance threshold before translocation.

In the example of FIG. 6, the orientation of the user's field of view 308 has moved beyond the initial haptic feedback of haptic device 304*b*. Accordingly, the haptic signal 502 is translocated to another haptic device to continue general correlation with the vehicle obstacle 202. As shown, the haptic signal 502 of FIG. 5 is translocated to the haptic device 304*a* to generate a translocated haptic signal 602 to provide direction guidance for the user field of view 308. As the status changes for the vehicle obstacle 202 (that is, it no longer may present a danger and/or threat to the vehicle 100), the HMI device control unit 420 may disengage the translocated haptic signal 602.

Figure 7:
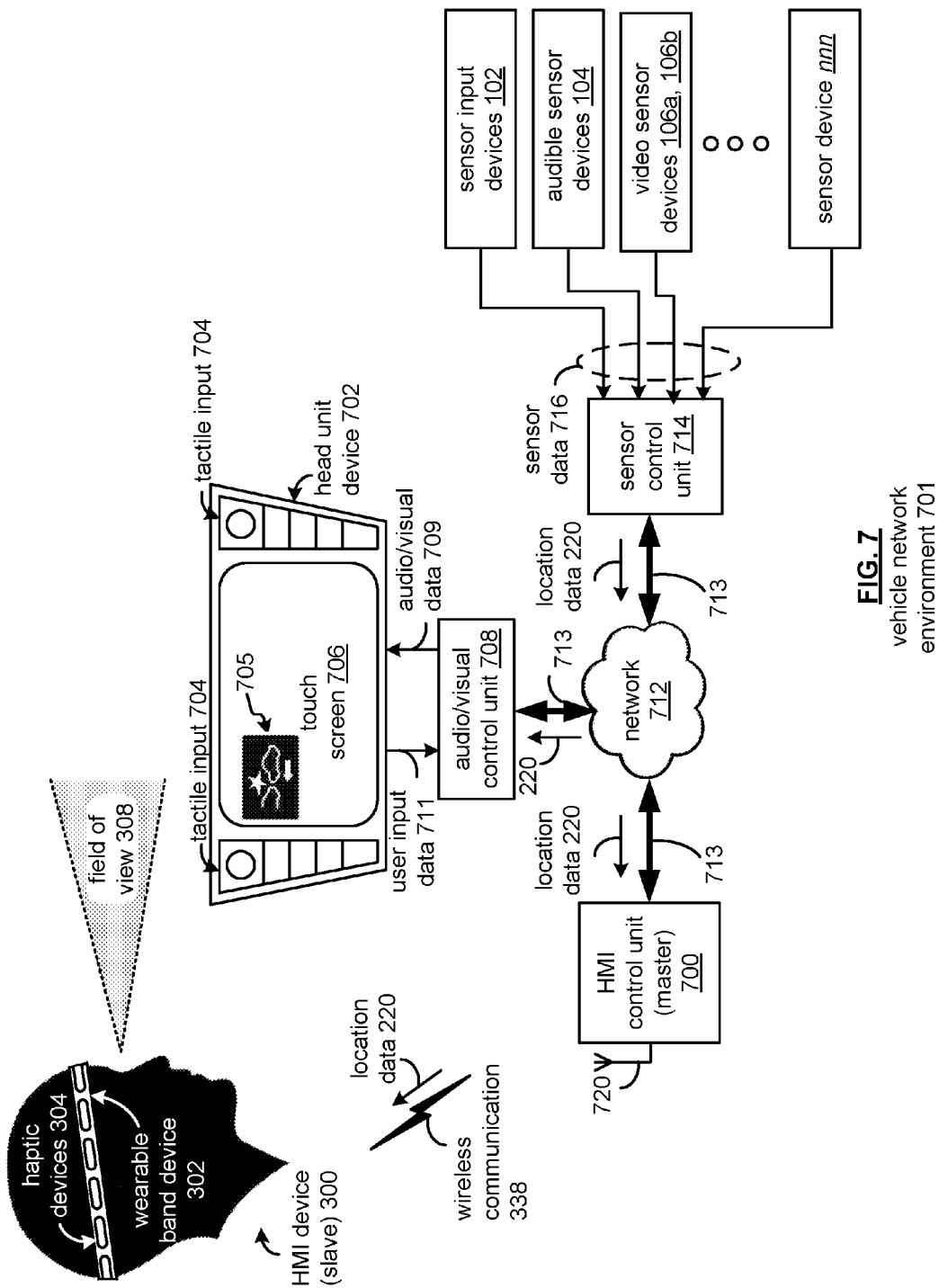
FIG. 7 shows a block diagram of the HMI control unit and the HMI device in the context of a vehicle network environment.

FIG. 7 shows a block diagram of the HMI control unit 700 and the HMI device 300 in the context of a vehicle network environment 701.

While the HMI control unit 700 is depicted in abstract with other vehicular components, the HMI control unit 700 may be combined with other system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 7, a vehicle network environment 701 may include the HMI control unit 700, an audio/visual control unit 708, and a sensor control unit 714, that are communicatively coupled via a network 712 and communication paths 713.

The HMI control unit 700 may be in communication with a head unit device 702 via a communication path 713 and network 712, and may also communicate with the sensor control unit 714 to access sensor data 716 from sensor devices 102, 104, 106 through nnn. As may be appreciated, additional sensor devices, indicated by the variable nnn, may provide additional sensor data, and that the sensor devices discussed with respect to FIG. 7 are not intended to be limiting or exhaustive with respect to the embodiments herein. The HMI control unit 700 may also be wirelessly coupled via the antenna 720 and wireless communication 338 to a HMI device 300.

In this manner, the HMI control unit 700 operates to receive input data, such as sensor data 716, and provide location data 220 to the HMI device 300. The audio/visual control unit 708 may be communicatively coupled to receive the sensor data 716 from the sensor control unit 714, including data values relating to location data 200 for a vehicle obstacle 202 (see, e.g., FIG. 2).

The HMI control unit 700 may provide data such as a near real-time location data 220 to indicate a vehicle obstacle that may present a danger and/or threat to the vehicle 100 to the user 240. The signal location data 220 may also be announced by displaying a visual indicator 705 to the touch screen 706 of the head unit device 702.

The use of the term "near real-time" or (NRT) refers to time delay that may be introduced, by the HMI control unit 700 processing vehicle obstacle data from either of, or in combination with, the sensor input devices 102, the audible sensor devices 104, the video sensor devices 106*a*, 106*b*, to sensor device nnn, and/or a time delay that may be introduced by transmission of the sensor data 716 over the vehicle network 712 and transmission of the location data 220 from the point of identifying the vehicle obstacle 202.

As discussed in detail herein, the HMI control unit 700 operates as a master to the HMI device (slave) 300, indicating an example master/slave communication model. Under a master/slave communication model, the HMI control unit 700 may operate to control the HMI device 300. In this manner, to provide location data on a NRT basis, the HMI control unit 700 may operate to override and/or take precedence of other operations of the HMI device 300. In this manner, the HMI control unit 700 may operate to provide location data 220 of a vehicle obstacle 202 to the HMI device 300. In turn, the HMI device 300 is operable to generate and deliver haptic signals based on the location data 220.

The HMI control unit 700 may include an antenna 720 coupled to a wireless communications interface to provide wireless communication with the HMI device 300

The vehicle obstacle visual indicator 705 may also be provided via a conventional instrument cluster assembly of the vehicle, such as an indicator light (LED, LCD, backlit, etc.), graphic icon, etc. An example of such a visual indicator 705 is a collision warning indicator light that illuminates upon detection of a vehicle obstacle 202.

Still referring to FIG. 7, the audio/visual control unit 708 operates to provide, for example, audio/visual data 709 for display to the touch screen 706, as well as to receive user input data 711 via a graphic user interface. The audio/visual data 709 and input data 711 may include audio data, hands-free phone data, voice control data, navigation data, USB connection data, DVD play function data, multifunction meter function data, illumination signal data for the touch screen 706 (such as dimming control), driving status recognition data (such as vehicle speed, reverse, etc. via sensor data 716), composite image signal data (such as data via sensor devices 102, 104 and/or 106), etc.

In FIG. 7, the head unit device 702 may include tactile input 704 and a touch screen 706. The touch screen 706 operates to provide visual output or graphic user interfaces such as, for example, maps, navigation, entertainment, information, infotainment, and/or combinations thereof.

The touch screen 706 may include mediums capable of transmitting an optical and/or visual output such as, for example, a cathode ray tube, light emitting diodes, a liquid crystal display, a plasma display, or other two dimensional or three dimensional display that displays graphics, text or video in either monochrome or color in response to display data 709.

Moreover, the touch screen 706 may, in addition to providing visual information, detect the presence and location of a tactile input upon a surface of or adjacent to the display. Additionally, it is noted that the touch screen 706 can include at least one or more processors and one or more memory modules to support the operations described herein.

The head unit device 702 may also include tactile input and/or control inputs such that the communication path 713 communicatively couples the tactile input to other control units and/or modules of the vehicle 100 (FIG. 1). The tactile input data may provided by devices capable of transforming mechanical, optical, or electrical signals into a data signal capable of being transmitted via the communication path 713.

The tactile input 704 may include number of movable objects that each transform physical motion into a data signal that can be transmitted over the communication path 713 such as, for example, a button, a switch, a knob, a microphone, etc.

The touch screen 706 and the tactile input 704 may be combined as a single module, and may operate as an audio head unit or an infotainment system of the vehicle 100. The touch screen 706 and the tactile input 704 can be separate from one another and operate as a single module by exchanging signals via the communication path 713 via audio/visual data 709 and/or user input data 711.

The head unit device 702 may be provide information regarding vehicle operation conditions based on display data 709 from the audio/visual control unit 708. Moreover, the graphics-based instrument cluster display, or may provide a such instrument cluster display to other monitor devices for the vehicle 100, such as a heads-up display (not shown), or to an instrument cluster in the vehicle dash assembly behind the vehicle steering wheel.

The audio/visual control unit 708 operates to receive user input data 711, and provides display data 709. The display data 709 may include operational information based on the sensor data 716. The sensor control unit 714 provides access to sensor data 716 of the sensor devices 102, 104 and/or 106 to sensor device nnn, etc.

The sensor data 716 may also operate to permit vehicle obstacle detection external to the vehicle, such as for example, other vehicles (including vehicles occupying a parking location), roadway obstacles, traffic signals, signs, trees, pedestrians, cyclists, etc. Accordingly, the sensor data 716 allows the vehicle 100 (see FIG. 1) to assess its environment in order to maximize safety for vehicle passengers and objects and/or people in the environment.

As may be appreciated, the communication path 713 of the vehicle network environment 701 may be formed by a medium suitable for transmitting a signal such as, for example, conductive wires, conductive traces, optical waveguides, or the like. Moreover, the communication paths 713 can be formed from a combination of mediums capable of transmitting signals.

The communication path 713 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The wireless communication 338 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

Figure 8:
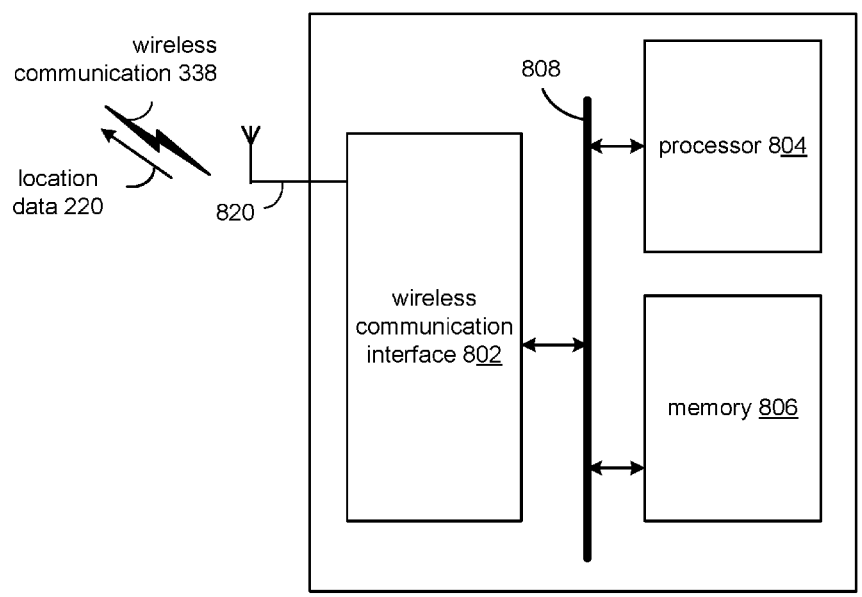
FIG. 8 is a block diagram of a HMI device control unit of the HMI device of FIG. 3.

FIG. 8 is a block diagram of a HMI device control unit 420 (slave), which includes a wireless communication interface 802, a processor 804, and memory 806, that are communicatively coupled via a bus 808.

The processor 804 of the HMI device control unit 420 can be a conventional central processing unit or any other type of device, or multiple devices, capable of manipulating or processing information. As may be appreciated, processor 804 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 806 may be a single memory device, a plurality of memory devices, and/or embedded circuitry of the processor 804. Such a memory device may be a read-only memory, random access memory, volatile memory, non-volatile memory, static memory, dynamic memory, flash memory, cache memory, and/or any device that stores digital information. The memory 806 is capable of storing machine readable instructions such that the machine readable instructions can be accessed by the processor 804. The machine readable instructions can comprise logic or algorithm(s) written in programming languages, and generations thereof, (e.g., 1GL, 2GL, 3GL, 4GL, or 5GL) such as, for example, machine language that may be directly executed by the processor 804, or assembly language, object-oriented programming (OOP), scripting languages, microcode, etc., that may be compiled or assembled into machine readable instructions and stored on the memory 806. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 804 includes more than one processing device, the processing devices may be centrally located (e.g., directly coupled together via a wired and/or wireless bus structure) or may be distributively located (e.g., cloud computing via indirect coupling via a local area network and/or a wide area network). Further note that when the processor 804 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 804 executes, hard coded and/or operational instructions corresponding to at least some of the steps and/or functions illustrated in FIGS. 1-9 to receive, via the wireless communication interface, location data 220 relating to a vehicle obstacle identified by a vehicle sensor 102, 104 and/or 106, identify a haptic device of a plurality of haptic devices correlating to the location data 220 and to a directional reference 212 (see, e.g., FIG. 2), and generate a haptic signal, by the haptic device, to define a vector relating to the vehicle obstacle with respect to the directional reference 220.

The wireless communications interface 802 generally governs and manages the data received via the vehicle network over the wireless communication 338. There is no restriction on the present disclosure operating on any particular hardware arrangement and therefore the basic features herein may be substituted, removed, added to, or otherwise modified for improved hardware and/or firmware arrangements as they may develop.

The antenna 820, with the wireless communications interface 806, operates to provide wireless communications with the HMI device control unit 420, including wireless communication 338.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the HMI control unit 700 may also be used as an acceptable architecture of the HMI device control unit 420 for the HMI device 300 (see FIGS. 3-6), audio/visual control unit 708, and/or the sensor control unit 714 (see FIG. 7). The control units 406, 708 and 714 may each include a communication interface or a wireless communication interface, a processor, and memory that may be communicatively coupled via a data bus. As may be appreciated, other architectures may be implemented, with similar functional capabilities.

The processors for the control units 420, 708 and 714 may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the control units 420, 708 and 714 may be a single memory device, a plurality of memory devices, and/or embedded circuitry of the processor related to the control units 420, 708 and 714. Such a memory device may be a read-only memory, random access memory, volatile memory, non-volatile memory, static memory, dynamic memory, flash memory, cache memory, and/or any device that stores digital information.

Note that if the processor for each of the control units 420, 708 and 714 includes more than one processing device, the processing devices may be centrally located (e.g., directly coupled together via a wired and/or wireless bus structure) or may be distributively located (e.g., cloud computing via indirect coupling via a local area network and/or a wide area network). Further note that when the processor for each of the control units 420, 708 and 714 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor executes, hard coded and/or operational instructions corresponding to at least some of the steps and/or functions illustrated in FIGS. 1-9 to receive location data and provide sensory augmentation based on the location data and a reference based on the devices and methods described herein.

There is no restriction on the present disclosure operating on any particular hardware arrangement and therefore the basic features herein may be substituted, removed, added to, or otherwise modified for improved hardware and/or firmware arrangements as they may develop.

Figure 9:
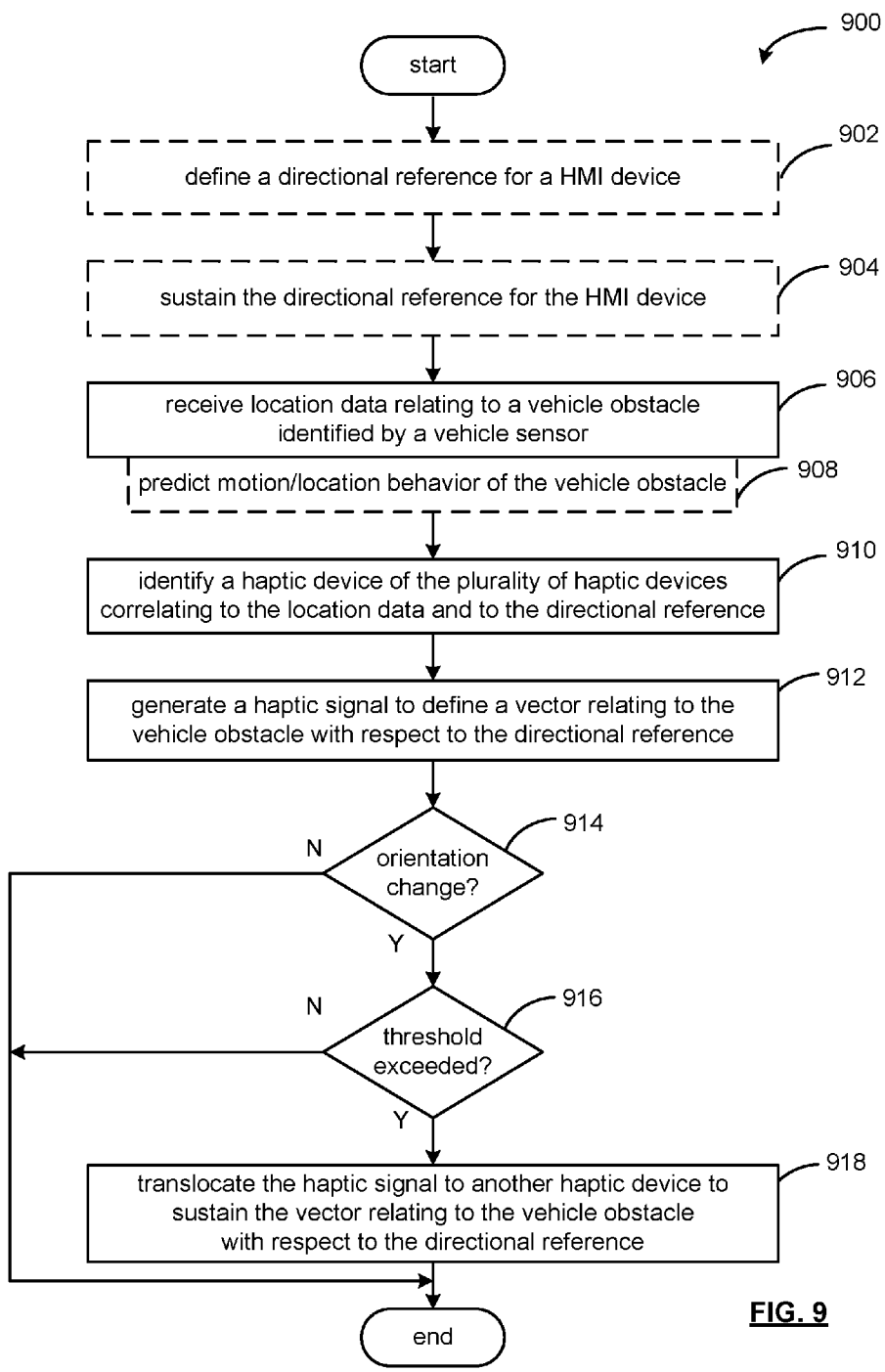
FIG. 9 is an example process in a HMI device control unit of FIG. 3 for sensory augmentation in a vehicle environment.

FIG. 9 is an example process 900 in a HMI device control unit 300 for sensory augmentation in a vehicle environment.

In operation 902, a HMI device defines a directional reference of a wearable band device relative to a plurality of haptic devices. The directional reference may be based on magnetic north, determined by a digital compass, or may be based on a heading and/or axis of symmetry of a vehicle. In operation 904, the HMI device sustains the directional reference. The operations 902 and 904 may engage on an initial configuration with a vehicle, such as via a HMI control unit. The initial configuration may be initiated upon a pairing or establishing a communication link with the HMI control unit. Moreover, offsets relating to the relative position of the vehicle operator and/or passenger to the vehicle axis and centerlines may be applied to improve the operation of the HMI device 300.

At operation 906, the HMI device 300 may receive, via a wireless communication interface, location data relating to a vehicle obstacle identified by a vehicle sensor. The location data may be in polar or Cartesian formats sufficient to direct a user to locate the vehicle obstacle.

As noted herein, the term "obstacle" or "vehicle obstacle" as may be used herein refers to objects external to the present vehicle that may increase a hazard and/or danger to the present vehicle, or may increase a likelihood of a hazard and/or danger to the present vehicle to the extent that an evasive action may be needed to around and/or otherwise avoid such hazard and/or danger. Examples of an obstacle or vehicle obstacle may include a pedestrian, cyclist, object, another vehicle (car, SUV, truck, commercial vehicles, road debris, etc.).

An aspect of operation 906 may further include predicting a motion and/or location behavior of the vehicle obstacle at operation 908. For example, haptic devices of an HMI device 300 may be operable to provide predictive feedback on a tracking basis for the vehicle obstacle as generated by an HMI control unit. Such predictive feedback may be based an artificial and/or computer intelligence systems operable to perceive the environment of the vehicle obstacle, and to generate feedback to maximize awareness and tracking of the vehicle obstacle. Examples of artificial and/or computer intelligence systems may include implementation of probabilistic techniques, classifier/statistical learning techniques, neural networks, control theory techniques, etc., alone or in combination therewith.

At operation 910, a haptic device of a plurality of haptic devices is identified by the HMI device 300 that correlate to the location data and to the directional reference. With the haptic device identified, the HMI device generates, at operation 912, a haptic signal to define a vector relating to the vehicle obstacle with respect to the directional reference. With the vector, a user may locate the vehicle object. In an autonomous vehicle environment, the user is alerted to a reason for evasive or sudden changes in direction and/or speed by the vehicle 100. In a driver-assist vehicle environment, the user is alerted to the vehicle obstacle, and may take action for evasive or sudden changes in direction and/or speed to avoid the vehicle object.

When the user moves to locate the object, an orientation of the HMI device changes. When at operation 914 the orientation changes, and at operation 916, a change threshold is exceeded, the HMI device translocates, at operation 918, the haptic signal to another haptic device to sustain the vector relating to the vehicle obstacle with respect to the directional reference.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship. For example, when the desired relationship is that a first signal has a greater magnitude than a second signal, a favorable comparison may be achieved when the magnitude of the first signal is greater than that of the second signal, or when the magnitude of the second signal is less than that of the first signal. As the term "module" as may be used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments including a preferred embodiment, for implementing a human-machine interface (HMI) device to provide sensory augmentation to a user in a vehicle environment. It will be apparent to those skilled in the art that the disclosed invention may be modified in numerous ways and may assume many embodiments other than the preferred forms specifically set out and described above. Accordingly, it is intended by the appended claims to cover all modifications of the invention that fall within the true spirit and scope of the invention.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A human machine interface (HMI) device for sensory augmentation in a vehicle environment, the HMI device comprising:
    a wireless communication interface to service communication with a vehicle network;
    a wearable band device including a plurality of haptic devices distributed in a defined-relation along the wearable band device and operable to convey directional information;
    a processor coupled to the wireless communication interface and to the wearable band device, the processor for controlling operations of the wearable band device; and
    a memory coupled to the processor, the memory for storing data and program instructions used by the processor, the processor configured to execute instructions stored in the memory to:
        receive, via the wireless communication interface, vehicle obstacle location data relating to a vehicle obstacle identified by a vehicle sensor;
        identify a haptic device of the plurality of haptic devices correlating to the vehicle obstacle location data and to a directional reference;
        generate a haptic signal, by the haptic device, to define a vector relating to the vehicle obstacle with respect to the directional reference, wherein the haptic signal provides sensory augmentation to draw a field-of-view towards the vehicle obstacle;
        determine when an orientation change occurs to the wearable band device;
        when the orientation change exceeds a threshold, translocate the haptic signal to another haptic device of the plurality of haptic devices to sustain the vector relating to the vehicle obstacle with respect to the directional reference in order to continue to draw the field-of-view towards the vehicle obstacle;
        wherein the threshold corresponds to a gap size between at least two adjacent haptic devices of the plurality of haptic devices and wherein the processor is further configured to:

translocate the haptic signal to another haptic device of the plurality of haptic devices when the orientation change is larger than the gap size; and maintain the haptic signal at the haptic device when the orientation change is not larger than the gap size.

2. The HMI device of claim 1, wherein the processor being further configured to execute further instructions stored in the memory to:

determine whether the vehicle obstacle location data calls for the haptic signal to be applied by the haptic device.

3. The HMI device of claim of claim 1, wherein the processor being further configured to execute further instructions stored in the memory to:

identify another haptic device of the plurality of haptic devices further correlating to the vehicle obstacle location data and to the directional reference; and generate another haptic signal, by the another haptic device, to further define the vector relating to the vehicle obstacle with respect to the directional reference, the another haptic signal having a magnitude different from a magnitude of the haptic signal of the haptic device.

4. The HMI device of claim 1, wherein the wearable band device comprising at least one of a:

belt;
sash;
girdle;
strap;
choker;
cummerbund; and
a headband.

5. The HMI device of claim 1, wherein the directional reference comprising at least one of:

magnetic north reference data; and
vehicle directional reference data.

6. The HMI device of claim 1, wherein each of the plurality of haptic devices comprise at least one of:

a tension-based haptic device;
a vibrotactile haptic device;
a temperature-based haptic device;
a surface haptic device; and
a linkage-based haptic device.

7. A human machine interface (HMI) device comprising:

a wireless communication interface to service communication with a vehicle network;

a wearable band device including a plurality of haptic devices distributed in a defined-relation along the wearable band device and operable to convey directional information;

a processor coupled to the wireless communication interface and to the wearable band device, the processor for controlling operations of the wearable band device; and a memory coupled to the processor, the memory for storing data and program instructions used by the processor, the processor configured to execute instructions stored in the memory to:

define a directional reference of the wearable band device relative to the plurality of haptic devices;

sustain the directional reference;

receive, via the wireless communication interface, vehicle obstacle location data relating to a vehicle obstacle identified by a vehicle sensor;

identify a haptic device of the plurality of haptic devices correlating to the vehicle obstacle location data and to the directional reference;

generate a haptic signal, by the haptic device, to define a vector relating to the vehicle obstacle with respect to the directional reference, wherein the haptic signal provides sensory augmentation to draw a field-of-view towards the vehicle obstacle;

determine when an orientation change occurs to the wearable band device;

when the orientation change exceeds a threshold, translocate the haptic signal to another haptic device of the plurality of haptic devices to sustain the vector relating to the vehicle obstacle with respect to the directional reference in order to continue to draw the field-of-view towards the vehicle obstacle;

wherein the threshold corresponds to a gap size between at least two adjacent haptic devices of the plurality of haptic devices and wherein the processor is further configured to:

translocate the haptic signal to another haptic device of the plurality of haptic devices when the orientation change is larger than the gap size; and maintain the haptic signal at the haptic device when the orientation change is not larger than the gap size.

8. The HMI device of claim 7, wherein the processor being further configured to execute further instructions stored in the memory to:

determine whether the vehicle obstacle location data calls for the haptic signal to be applied by the haptic device.

9. The HMI device of claim 7, wherein the wearable band device comprising at least one of a:

belt;
sash;
girdle;
strap;
choker;
cummerbund; and
a headband.

10. The HMI device of claim 7, wherein the directional reference comprising at least one of:

magnetic north reference data; and
vehicle directional reference data.

11. The HMI device of claim 10, wherein the vehicle directional reference data being in relation to magnetic north.

12. The HMI device of claim 7, wherein each of the plurality of haptic devices comprise at least one of:

a tension-based haptic device;
vibrotactile haptic device;
a temperature-based haptic device;
a surface haptic device; and
a linkage-based haptic device.

13. A method in a human machine interface (HMI) device for sensory augmentation in a vehicle environment, the method comprising:

receiving, via a vehicle network, vehicle obstacle location data relating to a vehicle obstacle identified by a vehicle sensor;

identifying a haptic device of a plurality of haptic devices correlating to the vehicle obstacle location data and to a directional reference, wherein the plurality of haptic devices distributed in a defined-relation along a wearable band device and operable to convey directional information;

generating a haptic signal, by the haptic device, to define a vector relating to the vehicle obstacle with respect to the directional reference, wherein the haptic signal provides sensory augmentation to draw a field-of-view towards the vehicle obstacle;

determining whether an orientation change occurs to the wearable band device;

when the orientation exceeds a threshold, translocating the haptic signal to another haptic device of the plurality of haptic devices to sustain the vector relating to the vehicle obstacle with respect to the directional reference in order to continue to draw the field-of-view towards the vehicle obstacle;

wherein the threshold corresponds to a gap size between at least two adjacent haptic devices of the plurality of haptic devices and translocating the haptic signal further comprises:

translocating the haptic signal to another haptic device of the plurality of haptic devices when the orientation change is larger than the gap size; and maintaining the haptic signal at the haptic device when the orientation change is not larger than the gap size.

14. The method of claim 13, further comprising:
determining whether the vehicle obstacle location data calls for the haptic signal to be applied by the haptic device.

15. The method of claim 13, wherein the directional reference comprising at least one of:
magnetic north reference data; and
vehicle directional reference data.

16. The method of claim 15, wherein the vehicle directional reference data being in relation to magnetic north.

17. The method of claim 13, wherein each of the plurality of haptic devices comprise at least one of:
a tension-based haptic device;
a vibrotactile haptic device;
a temperature-based haptic device;
a surface haptic device; and
a linkage-based haptic device.

\* \* \* \* \*

UNITED STATES PATENT AND TRADEMARK OFFICE
CERTIFICATE OF CORRECTION

| | |
|---|---|
| PATENT NO. | : 9,994,235 B2 |
| APPLICATION NO. | : 15/267548 |
| DATED | : June 12, 2018 |
| INVENTOR(S) | : Danil V. Prokhorov |

Page 1 of 1

It is certified that error appears in the above-identified patent and that said Letters Patent is hereby corrected as shown below:

In the Claims

Column 19, Line 11 reading "claim of claim 1" should read --claim 1--

Column 20, Line 45 reading "vibrotactile haptic device" should read --a vibrotactile haptic device--

Signed and Sealed this
Twenty-third Day of April, 2019

Andrei Iancu
*Director of the United States Patent and Trademark Office*